United States Patent

Corteel

[15] 3,645,845

[45] Feb. 29, 1972

[54] RECOVERY OF NITROGENOUS MATERIAL FROM MICRO-ORGANISMS

[72] Inventor: Philippe Corteel, Versailles, France

[73] Assignee: The British Petroleum Company Limited, London, England

[22] Filed: Apr. 13, 1967

[21] Appl. No.: 630,510

[30] Foreign Application Priority Data

Apr. 15, 1966 Great Britain......................16,536/66

[52] U.S. Cl............................................195/4, 195/2, 99/14
[51] Int. Cl. .......................................................C12d 13/06
[58] Field of Search........................195/2, 4, 5, 29, 102, 104; 99/9, 14

[56] References Cited

UNITED STATES PATENTS

| | | | |
|---|---|---|---|
| 3,088,879 | 5/1969 | Weaver | 195/2 |
| 3,178,359 | 4/1965 | Weaver | 195/2 |
| 3,330,735 | 7/1967 | Napier | 195/5 |

*Primary Examiner*—Lionel M. Shapiro
*Attorney*—Morgan, Finnegan, Durham and Pine

[57] ABSTRACT

Cells of a micro-organism are treated with a proteolytic enzyme to cause degeneration of protein components of the cell wall, thereafter deactivating or removing the proteolytic enzyme and continuing enzymatic attack on the cell wall with a carbohydratase (whereby attack on the protein of the cytoplasm is avoided or reduced) thereafter recovering an aqueous fraction containing nitrogeneous material.

9 Claims, No Drawings

RECOVERY OF NITROGENOUS MATERIAL FROM MICRO-ORGANISMS

This invention relates to a process for the recovery of nitrogeneous material from micro-organisms.

Processes are well known for the rupture of the cell walls of micro-organisms. While these methods are efficient for the rupture of the cell walls they have defects which detract from their value as a basis for a commercial process for the recovery of cytoplasmic nitrogeneous material from micro-organisms.

A process has been proposed for the rupture of cell walls by means of an enzyme which attacks carbohydrate components of compounds, present in the cell wall, in which these components form a part. Thus, it has previously been proposed, a beta-glucanase may be employed to attack cellulose and mannan structures in the cell wall.

In distinction to this previously proposed process there is now provided a process in which, in an initial enzymic step, a micro-organism is treated with a proteolytic enzyme, whereby compounds of carbohydrate and protein in the cell wall are attacked and thereafter the weakened cell wall is attacked by means of an enzyme which attacks a carbohydrate component of the cell wall, whereby the cell wall is further weakened or is ruptured.

Thus according to the present invention there is provided a process which comprises treating with a proteolytic enzyme a material which consists of or contains cells of a micro-organism, said cells having a cell wall, constructed at least in part of at least one compound having a carbohydrate component and a protein component, the treatment of said material being carried out whereby degeneration of the protein component takes place and whereby the carbohydrate component is rendered susceptible to enzymic attack, thereafter deactivating or removing the proteolytic enzyme which is present in the cell walls, thereafter further treating said material, or a fraction containing the first treated micro-organism which has been recovered therefrom, with an enzyme, capable of attacking a carbohydrate present in the cell wall, whereby degeneration of said carbohydrate takes place and thereafter, with or without an intermediate step for the further attack on or rupturing of the cell wall, recovering an aqueous fraction containing nitrogeneous compounds in solution and/or suspension.

Within the term "micro-organism" used herein we include mixtures of micro-organisms.

Micro-organisms which are treated as herein described may be yeasts, moulds or bacteria.

The bacteria referred to in this specification are classified according to the system described in "Bergey's Manual of Determinative Bacteriology" by R. S. Breed, E. G. D. Murray and N. R. Smith (1957) 7th Edition, published by Williams (Baltimore, U.S.A.). The yeasts are classified according to "The Yeasts—a Taxonomic Study" by Lodder and Kreger-van Rij (1952) published by North Holland Publishing Company (Amsterdam).

Preferably when a yeast is employed this is of the family Cryptococcaceae and particularly of the subfamily Cryptococcoideae; however, if desired there may be used, for example, ascosporogeneous yeasts of the subfamily Saccharomycoideae. Preferred genera of the Cryptococcoideae subfamily are Torulopsis (also known as Torula), Candida and Mycoderma. Preferred species of yeast are as follows. In particular it is preferred to use the specific stock of indicated reference number; these reference numbers refer to CBS stock held by the Centraal Bureau vor Schimmelculture, Baarn, Holland and to IMRA stock held by the Institut National de la Recherche Agronomique, Paris, France.

| | Preferred strain | |
|---|---|---|
| Candida | lipolytica | CBS 599 |
| Candida | pulcherrima | CBS 610 |
| Candida | utilis | CBS 890 |
| Candida | utilis, Variati major | CBS 841 |
| Candida | tropicalis | CBS 2317 |
| Candida | arborea | |
| Torulopsis | colliculosa | CBS 133 |
| Hansenula | anomala | CBS 110 |
| Oidium | lactis | |
| Neurospora | sitophila | |
| Mycoderma | cancoillote | INRA; STV 11 |

Of the above *Candida lipolytica* is particularly preferred.

Suitably there are used micro-organisms capable of growth on a straight chain paraffinic hydrocarbon. Preferably there are used micro-organisms which have been grown on a hydrocarbon containing substrate. Suitable substrate include kerosene, gas oils and lubricating oils; these feedstocks may be unrefined or may have undergone some refinery treatment, but will usually be required to contain a proportion of straight chain hydrocarbons in order to fulfill the purpose of this invention. Suitably there is used a petroleum fraction containing 3-45 percent by weight of straight chain hydrocarbons.

Preferably a petroleum fraction is used consisting at least in part of straight chain hydrocarbons and having a mean molecular weight corresponding to at least 10 carbon atoms per molecule.

Preferred methods for use in the cultivation of the micro-organism and for the recovery of the product are described in British Patent specification Nos. 914,567, 914,568, 1,017,584 and 1,017,585—also in British Patent application No. 44,606/62.

Preferably the proteolytic enzyme employed in the process of the invention is an enzyme having activity for breaking only a bond between two specific amino acids present in a protein component of the cell wall, whereby the extent of degradation of the protein component is severely limited. Furthermore, since some penetration of the cytoplasm by the proteolytic enzyme may occur, the sue of an enzyme with this limited activity is also desirable since it follows that any degradation of protein of the cytoplasm will be limited in similar manner.

Suitable proteolytic enzymes for use in the process include pepsin, trypsin, bromelin, ficin and papain.

The use of papain is preferred. Suitably the amount of papain employed is 0.2–0.3 percent by weight of dry cell weight.

Preferably, the proteolytic enzyme is employed under conditions such that a substantial proportion of the cellular nitrogeneous component is solubilized.

Preferably, however, the conditions under which the proteolytic enzyme is employed are also such that only a minor proportion of the cytoplasmic proteins is degraded, i.e., converted into low molecular weight polypeptides or into amino acids.

It is an important feature of the invention that the proteolytic enzyme is deactivated or removed after use and before treatment with an enzyme which attacks the carbohydrate of the cell. As a result of the attack on the carbohydrate, the protein of the cytoplasm is rendered more vulnerable to attack by a proteolytic enzyme and the rate of attack on protein of said type would be severe; it is for this reason that the deactivation or removal of the proteolytic enzyme at the appropriate stage is important. Furthermore, even in the first stage enzymatic attack on the cell wall, some attack on cytoplasmic protein will take place and for this reason also the period of contact of the cell with the proteolytic enzyme before removal or destruction of said enzyme should be limited to the period necessary for effecting the attack on the cell wall protein.

Preferably the determination of suitable conditions for the use of the proteolytic enzyme is carried out as follows:

After determination of the total cellular nitrogen, the sample of micro-organisms is treated in a series of tests, with increasing amounts of enzyme.

The total solubilized nitrogen is then estimated and the following ratio is calculated:

total solubilized nitrogen/total cellular nitrogen

The concentration of enzyme employed will be the minimum concentration corresponding to the maximum of this ratio.

Preferably the treated material remaining after the treatment with the proteolytic enzyme is subjected to phase separation and if desired the aqueous phase so recovered, with or without intervening treatment, may be reemployed or recycled for the treatment of further amounts of the micro-organism. Phase separation is preferably by centrifuging. After phase separation the micro-organism-containing fraction is preferably washed with an aqueous medium, suitably water, to remove the proteolytic enzyme, at least insofar as the enzyme is associated with the cell walls.

The washed micro-organism may be subjected to a further phase separation, suitably by centrifuging.

The micro-organism, having been treated to remove or destroy proteolytic enzyme associated with the cell wall, should be treated with an enzyme capable of attacking carbohydrates in the next treating stage without undue delay and certainly before there is time for the destruction of the cells by autolysis.

In this further treating stage at least some of the carbohydrate components of the cell wall, for example cellulose and mannan, are attacked. Since the enzymes which are employed are not proteolytic it is possible to operate under severe conditions without substantial degradation of protein of the cytoplasm. If desired a lipase may be employed, simultaneously or subsequently, to effect a further or more rapid weakening of the cell wall.

After treatment with enzymes for the degradation of the carbohydrates of the cell wall and also if desired for the degradation of lipids, the aqueous phase will contain a substantial proportion of the protein of the cytoplasm in solution or suspension.

The aqueous phase with colloidally suspended protein may be separated, for example by centrifuging.

If desired this aqueous phase may now be evaporated to recover a solid nitrogeneous product.

The invention is illustrated but not limited with reference to the following examples:

EXAMPLE 1

25 kilograms of an aqueous yeast cream containing 15 percent by weight of the yeast *Candida tropicalis* which has been grown on gas oil, then washed with a nonionic detergent, was brought to pH 7.6 by addition of a 2N soda solution; 270 grams of disodium phosphate ($PO_4HNa_2 \cdot H_2O$) and 5.34 of citric acid (citric acid $1H_2O$) was added; the temperature of the reaction mixture was brought to 70° C., when this temperature was reached 15 grams of papain (Schwartz) and 15 grams of cysteine hydrochloride was added; the temperature was kept at 70° C. for an hour; the material was then centrifuged so that a residue and a liquid product were obtained; this residue was washed with 8 liters of distilled water and recentrifuged. The resulting residue was taken up by 15 liters of distilled water, the pH was adjusted to 5 by adding a 2N solution of hydrochloric acid; 138 grams of disodium phosphate ($PO_4HNa_2 12H_2O$) and 38.1 grams of citric acid (citric acid $1H_2O$) were added; this new mixture was heated and kept at 40° C. for 2 hours in the presence of 25 grams of cellulase ($B_{50}$ made by SEAB) and 25 grams of lipase B (Rohm and Haas). The product was centrifuged and the liquid product obtained was added to the liquid products previously obtained by centrifuging. The mixture of liquids was dried by spray drying. 2.25 kilograms of dry product containing 11 percent by weight of nitrogen was obtained.

EXAMPLE 2

10 kilograms of an aqueous suspension of baker's yeast containing 15 percent of dry material (Saccharomyces cerevisiae) were brought to pH 7.6 by adding a 2N soda solution; then 3 liters of buffer at pH 7.6 (390 ml. of a 0.2N solution of monosodium phosphate and 2,610 ml. of a 0.2M solution of disodium phosphate) were added, the temperature of the suspension was brought to 70° C.; when this temperature was reached 6 grams of Schwartz "Ficine" and 3 grams of cysteine hydrochloride were added; this was left to digest for an hour and after centrifuging a liquid product and a residue were obtained; this residue was washed with 3 liters of distilled water and recentrifuged. The resulting residue was taken up by 3.3 liters of water and brought to pH 5 by a 2N hydrochloric acid solution. This suspension was mixed with 3.3 liters of phosphate buffer-citric acid, to give a pH=5. The temperature was maintained at 40° C. in the presence of 15 g. of cellulase (SEAB) and 15 grams of lipase B (Rohm and Haas) for 2 hours. The product was centrifuged and the liquid obtained was added to the liquid products previously obtained by centrifuging. The mixture of liquids was dried by spray drying. About 700 grams of dry product containing 10 percent by weight of nitrogen was obtained.

What we claim is:

1. A process which comprises treating a material with a proteolytic enzyme selected from the group consisting of pepsin, trypsin, bromelin, ficin and papain, such material essentially comprising cells of a yeast, said cells having a cell wall, constructed at least in part of at least one compound having a carbohydrate component and a protein component, the treatment of said material being carried out whereby degeneration of the protein component takes place and whereby the carbohydrate components is rendered susceptible to enzymic attack, thereafter deactivating or removing the proteolytic enzyme which is present in the cell walls, and further treating said material with an enzyme capable of attacking a carbohydrate present in the cell wall, whereby degeneration of said carbohydrates takes place and thereafter recovering an aqueous fraction containing nitrogenous compounds.

2. A process according to claim 1 in which papain is employed in an amount constituting 0.2–0.3 percent of the dry cell weight of the yeast.

3. A process according to claim 1 in which the treated material remaining after the treatment with the proteolytic enzyme is subjected to phase separation.

4. A process according to claim 3 in which, after phase separation, the yeast-containing fraction is washed with an aqueous medium.

5. A process according to claim 1 in which the enzyme which is employed to attach carbohydrate of the cell is a cellulase.

6. A process according to claim 5 in which a lipase is employed with the cellulase.

7. A process according to claim 1 in which the yeast is *Candida Lipolytica*.

8. A process according to claim 1 in which the yeast is *Candida tropicalis*.

9. A process according to claim 1 in which the yeast has been cultivated on a hydrocarbon-containing substrate.

* * * * *

PO-1050
(5/69)

UNITED STATES PATENT OFFICE
CERTIFICATE OF CORRECTION

Patent No. 3,645,845     Dated February 29, 1972

Inventor(s) Philippe Corteel

It is certified that error appears in the above-identified patent and that said Letters Patent are hereby corrected as shown below:

Column 1, line 68, "IMRA" should read -- INRA --;

Column 2, line 36, "sue" should read -- use --;

Column 3, line 49, "$(PO_4HNa_2.H_2O)$" should read -- $(PO_4HNa_2.12H_2O)$ --; and Claim 5, line 2, "attach" should read -- attack --.

Signed and sealed this 11th day of July 1972.

(SEAL)
Attest:

EDWARD M. FLETCHER, JR.
Attesting Officer

ROBERT GOTTSCHALK
Commissioner of Patents